(12) United States Patent
Borkgren et al.

(10) Patent No.: US 9,743,575 B2
(45) Date of Patent: Aug. 29, 2017

(54) COMMODITY CART TANK WITH UPPER AND LOWER FILL OPENINGS

(71) Applicant: Deere & Company, Moline, IL (US)

(72) Inventors: Stanley R. Borkgren, Geneseo, IL (US); Matthew J. Mentzer, Eldridge, IA (US); Ryan C. Jardon, Polk City, IA (US); William Douglas Graham, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/634,984

(22) Filed: Mar. 2, 2015

(65) Prior Publication Data

US 2016/0255767 A1    Sep. 8, 2016

(51) Int. Cl.
| | |
|---|---|
| A01C 3/04 | (2006.01) |
| B60P 3/22 | (2006.01) |
| A01C 7/08 | (2006.01) |
| A01C 15/00 | (2006.01) |

(52) U.S. Cl.
CPC ............ *A01C 7/081* (2013.01); *A01C 15/006* (2013.01); *A01C 15/003* (2013.01)

(58) Field of Classification Search
CPC ......... A01C 7/081; A01C 23/008; B60P 1/00; B60P 3/2205; B65D 88/26; B65D 88/54
USPC ................................................ 280/839, 4.12
See application file for complete search history.

(56) References Cited

U.S. PATENT DOCUMENTS

| | | | | |
|---|---|---|---|---|
| 2,185,030 A | * | 12/1939 | Lockwood ............ | B60P 3/2205 217/60 D |
| 3,325,177 A | * | 6/1967 | Welinder .............. | B60P 3/2205 105/247 |
| 3,625,137 A | * | 12/1971 | Johnson ................ | B60P 3/2255 280/837 |
| 4,108,380 A | * | 8/1978 | Richardson ............ | A01C 23/00 137/202 |
| 4,244,522 A | * | 1/1981 | Hartwig .............. | A01M 7/0085 111/121 |
| 5,419,400 A | * | 5/1995 | Wigington, Sr. ....... | E21B 21/01 166/379 |
| 5,829,370 A | | 11/1998 | Bender | |
| 7,300,073 B2 | * | 11/2007 | Bachman .............. | B60P 3/2205 137/590 |
| 2006/0249947 A1 | * | 11/2006 | Michael .................. | B29C 41/06 280/837 |

(Continued)

FOREIGN PATENT DOCUMENTS

DE    102012101333 A1    8/2013

OTHER PUBLICATIONS

German Search Report in foreign counterpart application 102016202887.1 dated Feb. 16, 2017 (7 pages).

*Primary Examiner* — Tony Winner

(57) ABSTRACT

A commodity tank for a product distribution machine has a hollow body enclosing an interior space with an upper fill opening through which product can flow into the interior space. For convenience of the operator, a lower fill opening is also provided though which product can flow into the interior space. The lower fill opening is located at a lower height relative to the upper fill opening. The provision of the lower fill opening enables the operator to choose between either bulk filling the tank using the cart conveyor through the upper opening or manually filling the tank through the lower opening.

13 Claims, 5 Drawing Sheets

(56) References Cited

U.S. PATENT DOCUMENTS

| | | | |
|---|---|---|---|
| 2007/0079739 A1 | 4/2007 | Meyer | |
| 2009/0071955 A1* | 3/2009 | Firth | B60P 3/2205 220/4.13 |
| 2013/0049342 A1* | 2/2013 | Cottrell | B60P 7/13 280/839 |
| 2013/0134013 A1* | 5/2013 | Borkgren | A01C 15/003 198/318 |
| 2015/0201552 A1* | 7/2015 | Bouten | A01M 7/0075 248/558 |

* cited by examiner

COMMODITY CART TANK WITH UPPER AND LOWER FILL OPENINGS

SUMMARY

A commodity tank for a product distribution machine has a hollow body enclosing an interior space with an upper fill opening through which product can flow into the interior space. For convenience of the operator, a lower fill opening is also provided though which product can flow into the interior space. The lower fill opening is located at a lower height relative to the upper fill opening. The provision of the lower fill opening enables the operator to choose between either bulk filling the tank using the cart conveyor through the upper opening or manually filling the tank through the lower opening.

DETAILED DESCRIPTION

Figure 1:
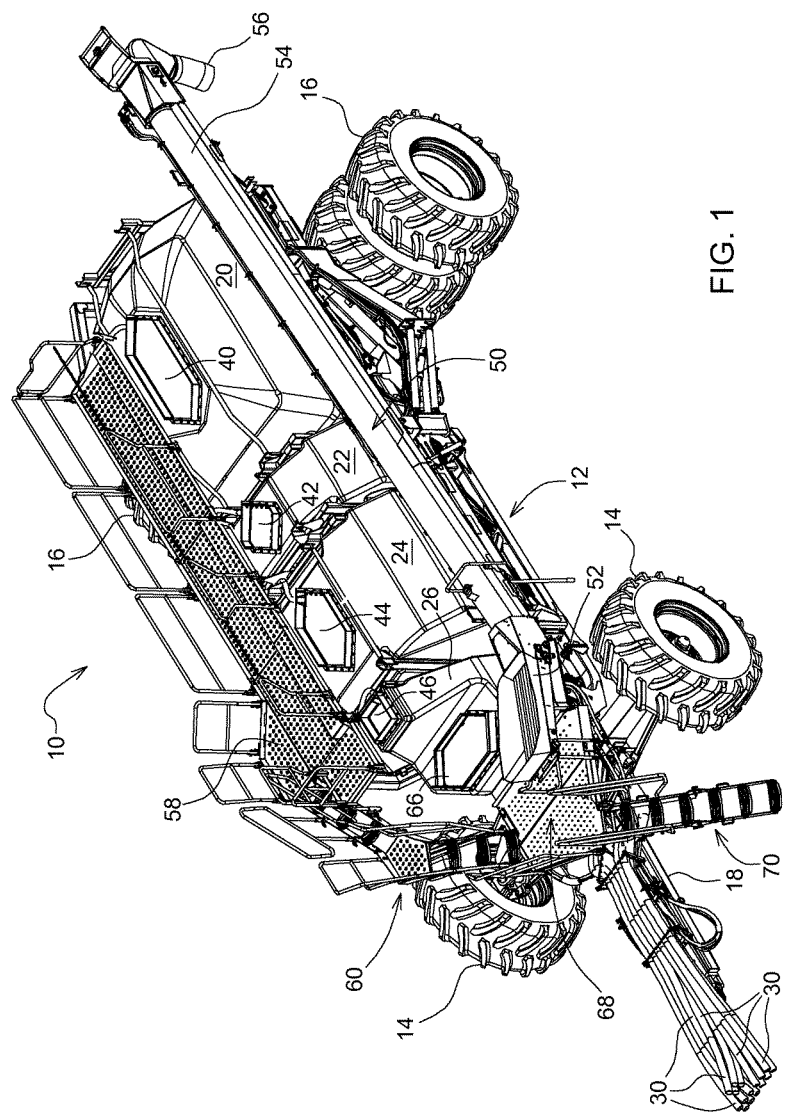
FIG. 1 is a perspective view of a commodity cart.

An agricultural commodity cart 10 is shown in FIG. 1. Cart 10 is part of a larger seeding system known as an air seeder or a pneumatic seeder. The cart 10 includes a frame 12 supported on front and rear wheels 14 and 16. A hitch tongue 18 extends forward from the frame for connection to a towing vehicle or to the rear of a tillage tool that receives product from the cart and places the seed and/or chemicals in the soil as the cart traverses a field. The cart 10, as shown, includes four commodity or product tanks 20, 22, 24, and 26. The tanks are designed to hold seed, fertilizer or other chemicals to be place in the soil of a field. Below each tank, a metering mechanism (not shown) controls the rate of flow of the product in the tank into conduits 30 through which an air stream conveys the products to the tillage tool for placement in the soil.

Each of the tanks defines a hollow interior space for holding the product. Upper fill openings 40, 42, 44, and 46 are provided at the upper ends of the tanks 20, 22, 24, and 26 respectively for the purpose of filling the interior spaces of the tanks with product. Product is provided to the upper fill openings by a conveyor 50 mounted to the frame 12. Conveyor 50 includes a lower fill hopper 52, a conveyor tube 54 and a discharge spout 56. The conveyor is movable to multiple locations to place the spout 56 at each of the upper fill openings. Bulk product is delivered by truck or tender to the hopper 52.

Front tank 26, in addition to the upper fill opening 46, includes a lower fill opening 66. A lower platform 68 in front of the tank 26 supports an operator at a convenient height to fill the tank 26 manually from bagged product through the lower fill opening. The lower platform 68 is located at a height such that bagged product can be lifted onto the lower platform 68 from either the ground or from a truck bed. Tank 26 is used for products used in small volumes where bulk fill is not always practical. With the lower fill opening 66 and the upper fill opening 46 for the tank 26, the operator can choose between bulk fill through the upper fill opening 46 and manual fill through the lower fill opening 66.

Cart 10 includes an upper platform 58 for an operator to access the upper fill openings 40, 42, 44 and 46. Upper platform 58 extends fore and aft relative to the travel direction laterally to the side of the upper fill openings. A stair case 60 at the front end of the cart provides access to the upper platform 58. The stair case 60 extends from the lower platform 68 to the upper platform 58. Stairs 70 allow the operator to access the lower platform 68.

Tank 26 has a lower portion 80 below the lower fill opening 66. An upper portion 82 extends upwardly from the lower portion 80. The cross sectional area of the upper portion 82 increase in the upward direction leading upward to the upper end and upper fill opening 46. This allows for a larger upper fill opening that partially overhangs the lower fill opening. By "overhang" it is meant that the front edge 88 of the upper opening 46 is forward of the rear edge 90 of the lower fill opening 65. The larger upper fill opening 46 facilitates positioning of the conveyor discharge spout above the opening.

The lower fill opening 66 may also be sized to allow an adult human to enter the tank 26 for service as necessary.

Figure 2:
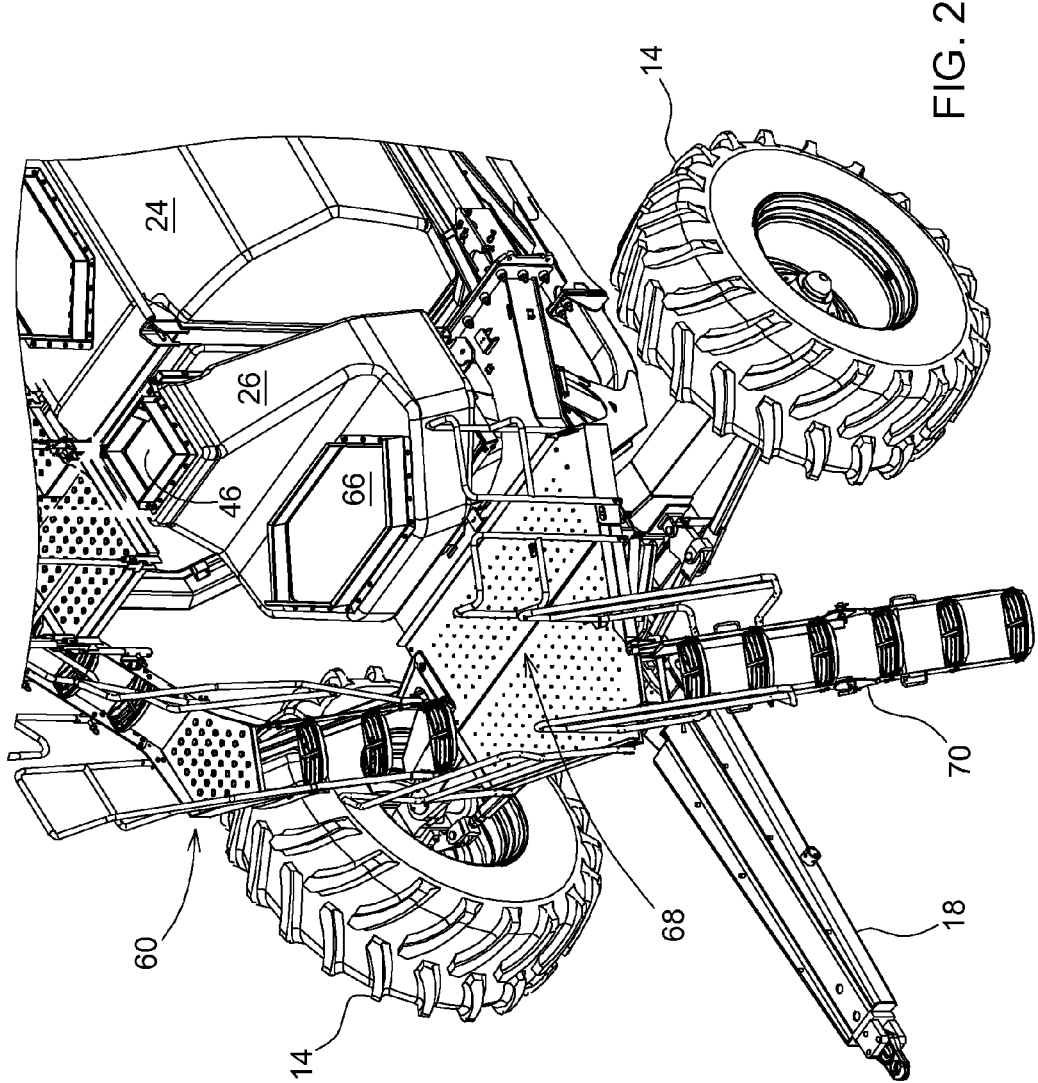
FIG. 2 is an enlarged perspective view of a front portion of the commodity cart of FIG. 1.
Figure 3:
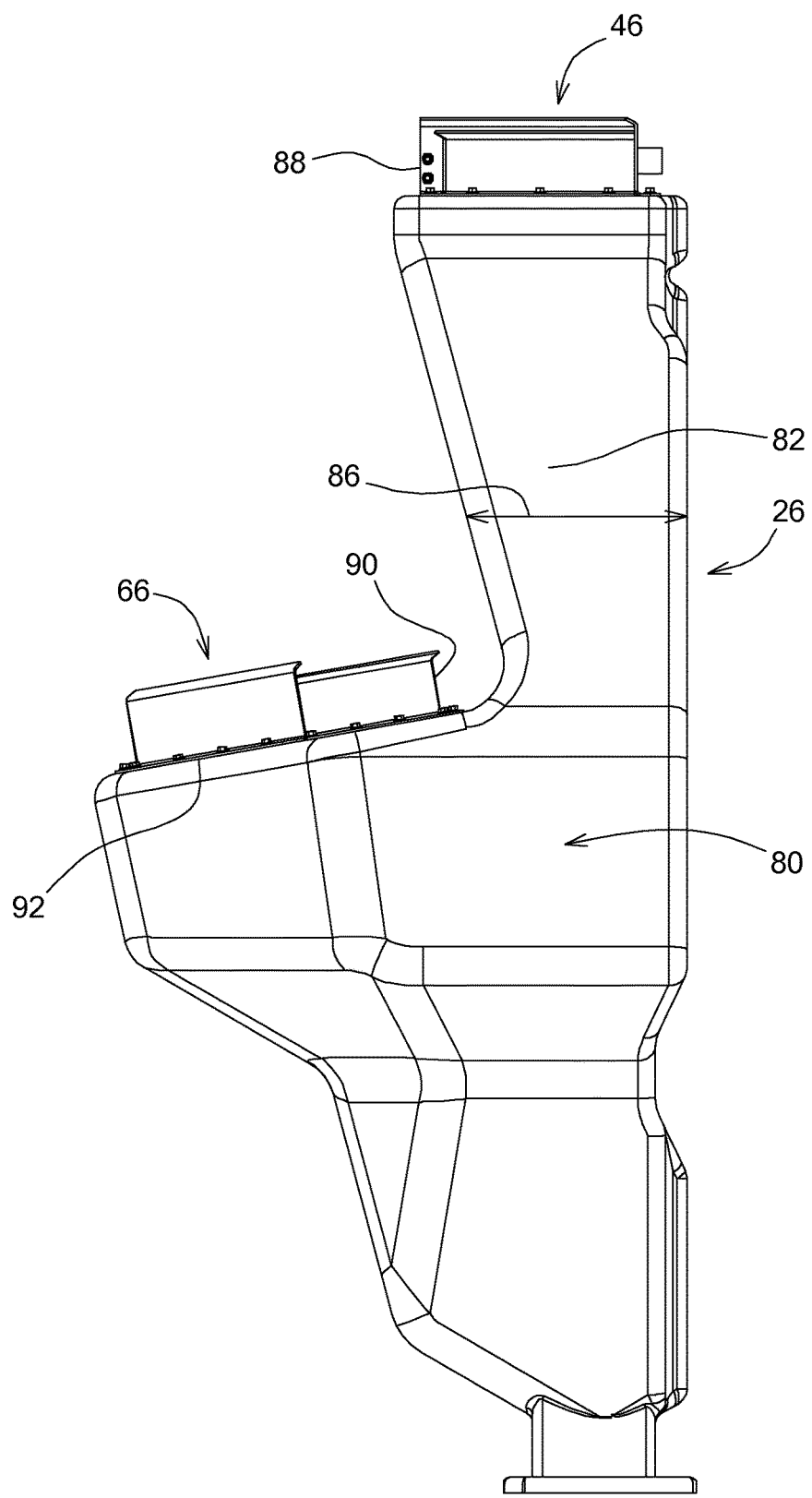
FIG. 3 is a side elevation view of one tank on the commodity cart of FIG. 1.
Figure 4:
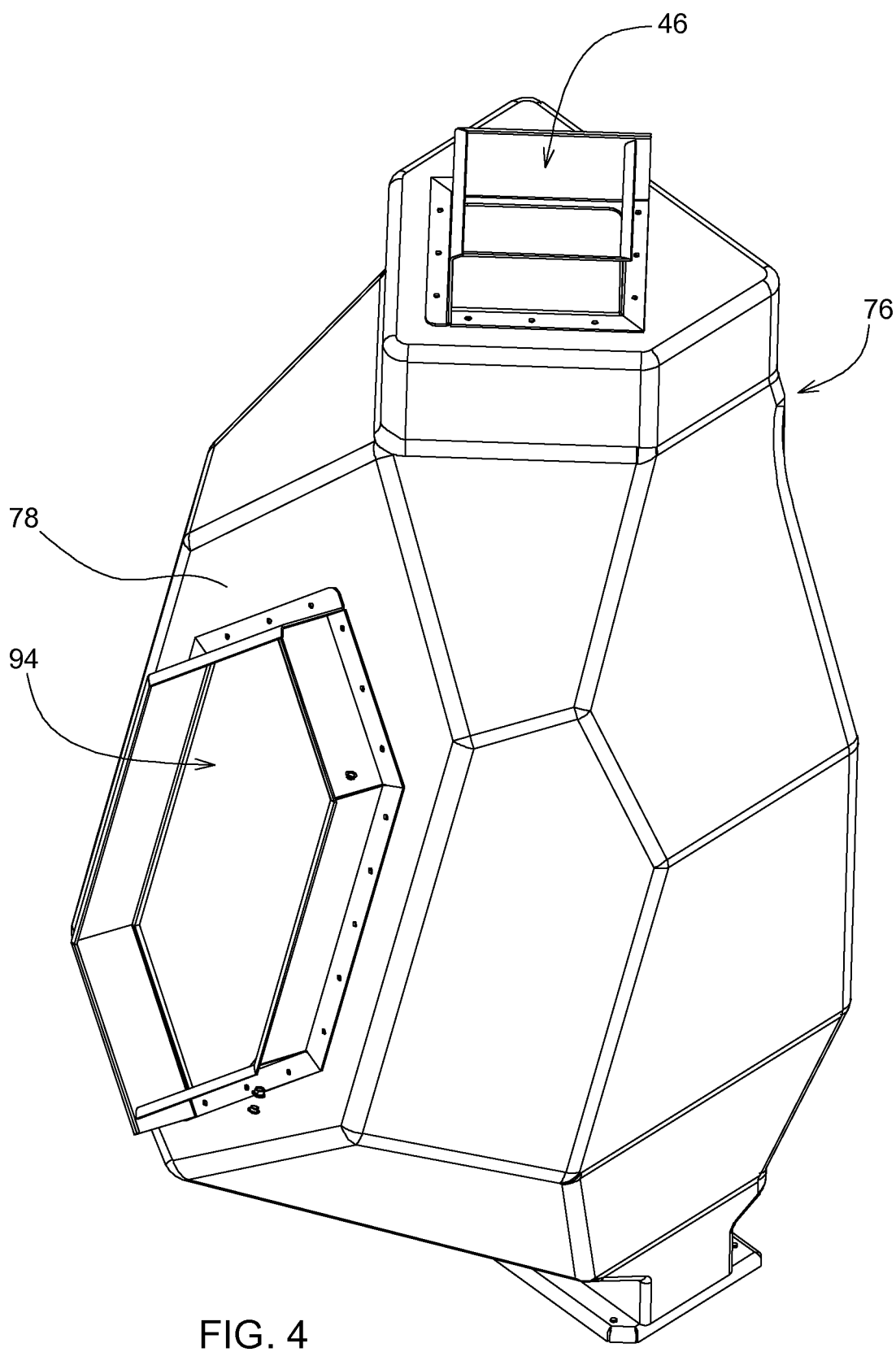
FIG. 4 is a perspective view of another embodiment of the tank of FIG. 3.
Figure 5:
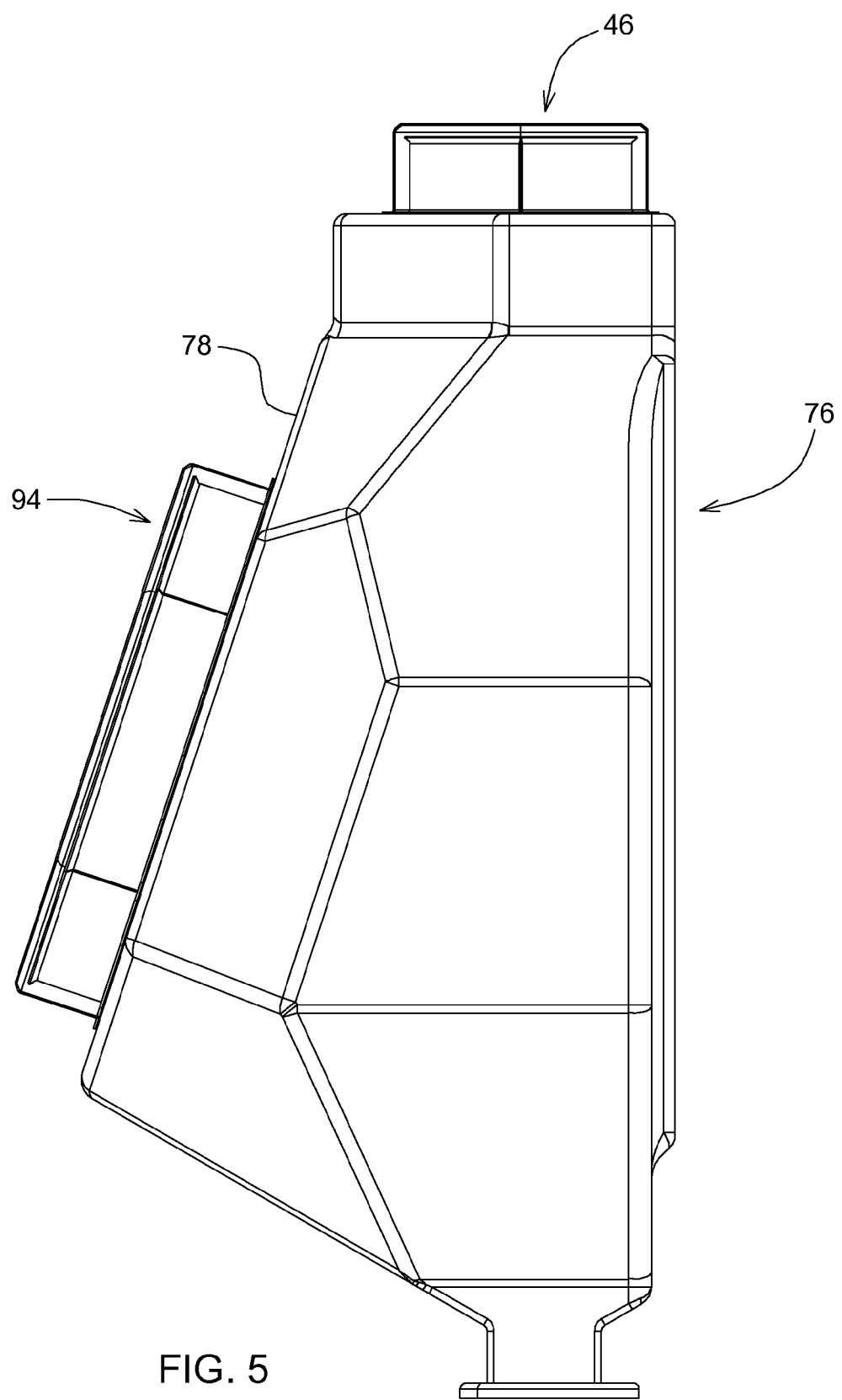
FIG. 5 is a side elevation view of the tank of FIG. 4

Upper fill openings 40, 42, 44, 46 are oriented generally horizontally. In the embodiment shown in FIGS. 1-3, the lower fill opening 66 is also placed in a wall 92 that is nearly horizontal and may be horizontal. The wall 92 is oriented at a slight angle upward to the rear of approximately 12 degrees to present a more convenient angle to an operator filling the tank 26 through the lower fill opening 66. The lower fill opening 66 is at a lower height than the upper fill opening 46. In an alternative embodiment, shown as tank 76 in FIGS. 4 and 5, the lower fill opening 94 is placed in a side wall 78 of the tank 76. The side wall 78 is at an angle of more than 45 degrees to the horizontal and is thus considered a side wall.

The tanks 20, 22, 24, and 26 are shown in FIG. 1 as being separate tank structures. In an alternative embodiment, the tanks can be formed as a single or unitary structure with interior walls dividing the structure into separate interior spaces. The claims that follow are to be interpreting to read on both individual tank structures and on a unitary tank structure. While four tanks are shown in FIG. 1, it will be apparent that the cart 10 can include any number of tanks.

Having described one embodiment of the air cart tank, it will become apparent that various modifications can be made without departing from the scope of the invention as defined in the accompanying claims.

The invention claimed is:

1. A commodity cart for carrying a product to be distributed over an area comprising:
   a frame supported on a plurality of wheels for movement of the cart;
   a plurality of tanks for holding products to be distributed, each tank enclosing an interior space and each tank having an upper fill opening at an upper end of each tank through which product flows into the interior space, each tank having a lower outlet;
   one or more conduits in communication with the tank outlets for pneumatic distribution of product from the tanks; and
   one tank of said plurality of tanks, in addition to the upper fill opening, having a lower fill opening through which product flows into the interior space at a lower position than the upper fill opening of said one tank wherein an operator can choose to fill said one tank through either the upper fill opening or the lower fill opening.

2. The commodity cart of claim 1 wherein the lower fill opening of the one tank is configured for an adult human to enter the interior space.

3. The commodity cart of claim 1 wherein both the upper fill opening and the lower fill opening of the one tank are oriented generally horizontally.

4. The commodity cart of claim 1 wherein the upper fill opening of the one tank is oriented generally horizontally and the lower fill opening of the one tank is located in a side wall of the tank at an angle relative to horizontal.

5. The commodity cart of claim 1 wherein the one tank has a lower portion below the lower fill opening and an upper portion extending upwardly from the lower portion to an upper end of the tank, the upper opening being located at the tank upper end, wherein the horizontal cross section of the tank upper portion increases in size in a vertically upward direction.

6. The commodity cart of claim 1 further comprising:
an upper platform adjacent the upper ends of the tanks for operator access to the upper fill openings;
a lower platform adjacent the lower fill opening of the one tank for operator access to the lower fill opening; and
a stair case extending from the lower platform to the upper platform for operator access to the upper platform.

7. The commodity cart of claim 6 wherein the lower platform is located forward, in a travel direction of the cart, of the one tank having the lower opening while the upper platform extends fore and aft relative to the travel direction laterally to a side of the upper fill openings.

8. The commodity cart of claim 1 wherein the upper fill openings of the plurality of tanks are generally at the same vertical elevation.

9. The commodity cart of claim 1 further comprising a conveyor having a lower fill hopper and an upper discharge spout movable to multiple locations to deliver product to the upper fill openings of the plurality of tanks.

10. A commodity cart for carrying a product to be distributed over an area comprising:
a frame supported on a plurality of wheels for movement of the cart;
a plurality of tanks for holding products to be distributed, each tank enclosing an interior space, each tank having an upper fill opening at an upper end of each tank through which product flows into the interior space;
at least one tank having a lower fill opening through which product flows into the interior space at a lower position than the upper fill opening of the at least one tank, and
the at least one tank having a lower portion below the lower fill opening and an upper portion extending upwardly from the lower portion to an upper end of the tank, the upper opening being located at the tank upper end, wherein the horizontal cross section of the tank upper portion increases in size in a vertically upward direction.

11. A commodity cart for carrying a product to be distributed over an area comprising:
a frame supported on a plurality of wheels for movement of the cart;
a plurality of tanks for holding products to be distributed, each tank enclosing an interior space, each tank having an upper fill opening at an upper end of each tank through which product flows into the interior space;
one tank, in addition to the upper fill opening, having a lower fill opening through which product flows into the interior space at a lower position than the upper fill opening of the at least one tank,
an upper platform adjacent the upper ends of the tanks for operator access to the upper fill openings;
a lower platform adjacent the lower fill opening of the one tank for operator access to the lower fill opening; and
a stair case extending from the lower platform to the upper platform for operator access to the upper platform.

12. The commodity cart of claim 11 wherein the lower platform is located forward, in a travel direction of the cart, of the one tank having the lower opening while the upper platform extends fore and aft relative to the travel direction laterally to a side of the upper fill openings.

13. The commodity cart of claim 11 further comprising a conveyor having a lower fill hopper and an upper discharge spout movable to multiple locations to deliver product to the upper fill openings of the plurality of tanks.

* * * * *